United States Patent
Stonack

[11] 3,913,651
[45] Oct. 21, 1975

[54] QUICKLY INSTALLED TIRE CHAIN
[75] Inventor: George H. Stonack, Puyallup, Wash.
[73] Assignee: Max L. Morton, Puyallup, Wash.
[22] Filed: Oct. 23, 1973
[21] Appl. No.: 408,674

[52] U.S. Cl.......... 152/213 R; 152/213 A; 152/219; 152/239; 152/241
[51] Int. Cl.² .......................................... B60C 27/06
[58] Field of Search.... 152/213 R, 213 A, 217–219, 152/221, 223, 225, 241, 242, 239

[56] References Cited
UNITED STATES PATENTS

| | | | |
|---|---|---|---|
| 1,030,238 | 6/1912 | Himeno | 152/213 A |
| 1,989,217 | 1/1935 | Sisk | 152/213 A |
| 2,553,849 | 5/1951 | Dines | 152/219 |
| 2,711,770 | 6/1955 | Conoscente et al. | 152/242 |
| 3,228,446 | 1/1966 | Meys | 152/241 |
| R23,221 | 4/1950 | Fox | 152/213 A |

Primary Examiner—Drayton E. Hoffman
Attorney, Agent, or Firm—Roy E. Mattern, Jr.

[57] ABSTRACT

An overall tire chain has, in effect, two principal counterbalanced tire chain portions which upon installation are draped quickly and conveniently down over the top of an installed wheel and tire assembly. Upon draping, the top and back cross tie chain of this overall tire chain is fully extended, and the bottom and back cross tie chain is not connected. A short length throw-through small link chain or equivalent flexible length member is connected at one of its ends at one end of the back cross tie chain and thrown behind the wheel and tire and kept below the axle. This throw-through chain is then pulled to conveniently bring the bottom and back cross tie chain into its hookable position for securement with its fastening means. The throw-through small chain is thereafter removed and reused when another overall tire chain is installed on the other drive wheel and tire of the same automobile. After both the back top cross tie chain and bottom cross tie chain are in their mounted places, then the front top cross tie chain and the bottom cross tie chain are secured, using a respective top turnbuckle assembly and a bottom turnbuckle assembly. After the tightening of these turnbuckle assemblies resulting in the tight securement of, in effect, the two principal counter-balanced tire chain portions, they are kept from becoming loose by tightening respective locking wing nuts snugly against portions of the turnbuckle, thereby preventing their turning and consequently keeping the overall tire chain in its effective traction position about the wheel and tire assembly. Although tire chains are illustrated and described using chain links, cable-roller tire chains are also adaptable to having the two principal counterbalanced portions securable with turnbuckles.

1 Claim, 8 Drawing Figures

U.S. Patent Oct. 21, 1975 3,913,651
FIG. 1
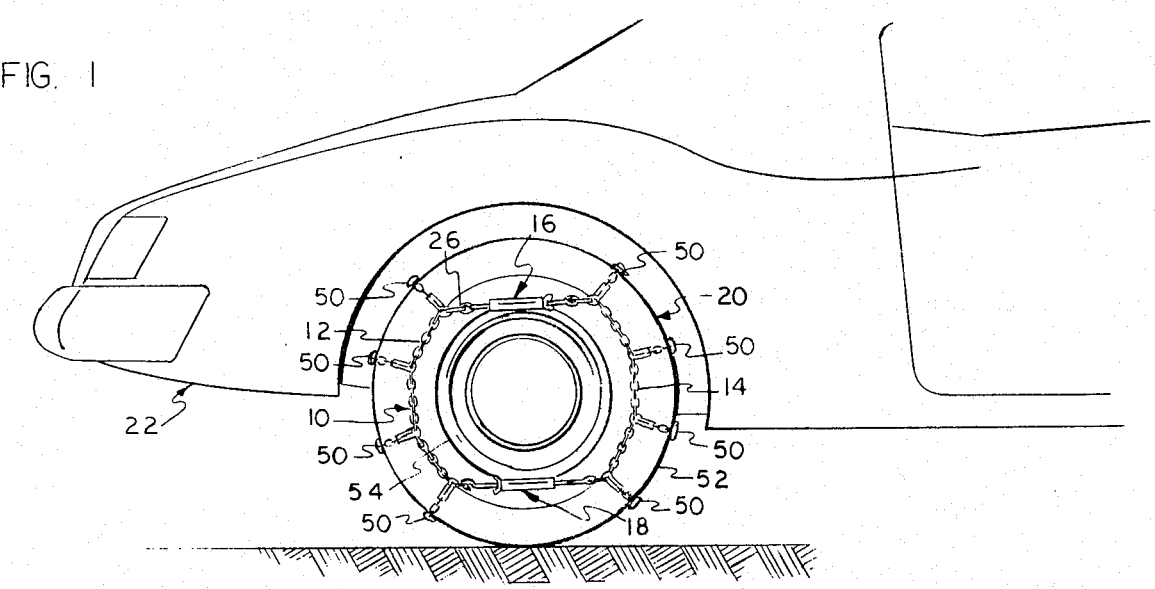
FIG. 2
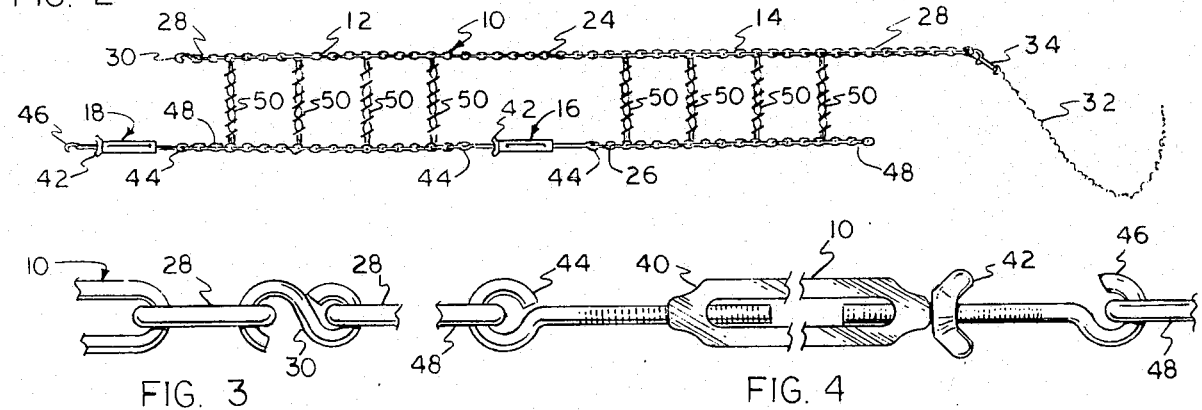
FIG. 3  FIG. 4
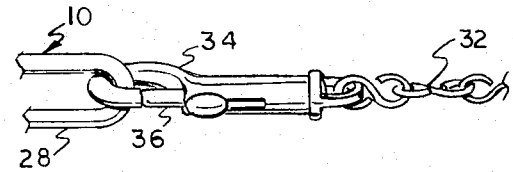
FIG. 5
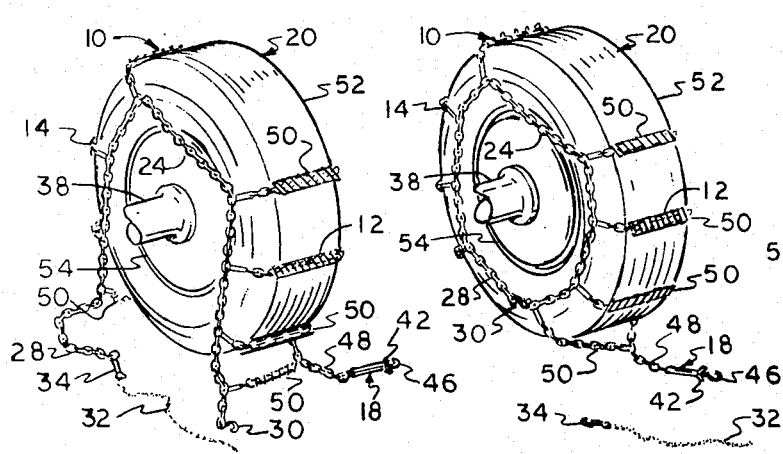
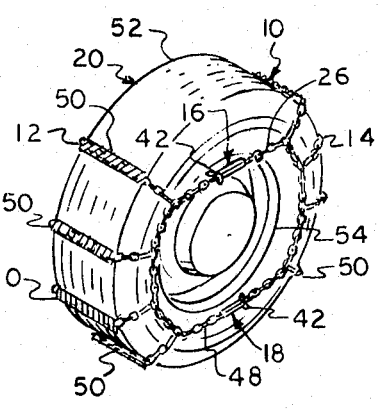
FIG. 6  FIG. 7  FIG. 8

QUICKLY INSTALLED TIRE CHAIN

BACKGROUND OF THE INVENTION

There have been many inventions offered to speed up the time and/or increase the convenience of putting on tire chains and tire cable-roller chains. Some inventions like Harry E. Skelton's shown in his U.S. Pat. No. 2,132,275 involve the utilization of all new component parts, except for his use of a turnbuckle. Some inventions like George Kunkle's in his U.S. Pat. No. 2,176,631, have entire new steel bar stock members, which are used to position three widely spaced pairs of chains, and both a single spring and a single turnbuckle are used. Other inventors try to provide for a fully circumferential tire chain which may be installed more conveniently such as Filbert G. Fox in his U.S. Pat. No. 2,462,378, wherein he uses a section 11A to be pulled behind a wheel with a hooked rod and then used as a transverse link using special connecting means. Also Winfred and Floyd Shepard provide a fully circumferential tire chain and before pulling one end up and over the mounted tire the lower back bottom portion is pulled through using a hooked end pulling tool 19. To make it possible to do this, two transverse chain links are left unsecured and must be subsequently fastened after the chain is completely draped in place over the mounted wheel. Patrick Champigny in his U.S. Pat. No. 2,714,914 in 1955 described his use of cable-rollers and cables to be used in lieu of chain links and also they were joined with cables.

Even though these previously offered tire chains or traction equivalent antiskid accessories have been offered, there remained a need for a better quickly installed overall tire chain. The draping of this chain had to be done more conveniently without removing the wheel and tire assembly, without moving the car under engine power over portions of a chain, and without jacking the vehicle with its wheel and the tire assembly off the ground. Once the chain was draped and well distributed, the tightening had to be effectively undertaken the first time, so upon driving away all portions of the chain were confined immediately adjacent the tire and wheel assembly. If so confined, no chain portions would strike portions of the vehicle frame and/or body, and/or would they wearably drag over tire portions when the vehicle was underway.

SUMMARY OF THE INVENTION

A quickly drapable and securable overall tire chain for snow and ice hazardous roadway travel conditions by having, in effect, two principal counter-balanced tire chain portions and paired turnbuckle connecting and take up assemblies, provides a tire chain immediately installable on a mounted tire wheel assembly without moving and/or jacking up the vehicle. No subsequent adjustment is needed, the installer at all times remaining on his or her feet without reaching back of the tire to install these tire chains, upon using a throw-through smaller chain.

Moreover, a particular chain size, because of the connecting and take up turnbuckle assemblies fits many more tire sizes and consequently manufacturers, distributors and/or sellers of tire chains may reduce their stock on hand requirements by a substantial amount. In addition, these chains are always installed in the right position. They are always easily tightened the first time, so thereafter, upon driving, there will not be any loose chain links or chain sections to beat the pavement and/or the vehicle. They are installed in a very short time and removed in even a shorter time, and they are easily installed by all motorists, man or woman.

DESCRIPTION OF THE DRAWINGS

A preferred embodiment of these quickly drapable and securable overall tire chains for snow and ice hazardous roadway travel conditions is illustrated in the drawings, wherein:

FIG. 1 is a partial side view of a vehicle showing the tire chain fully mounted;

FIG. 2 is a plan view looking down on the chain as it is fully extended, indicating the removable attachment of the smaller throw-through chain;

FIG. 3, is an enlarged partial side view of the hook and eyelet securement of the back and bottom cross tie chain portions;

FIG. 4 is an enlarged partial side view of the turnbuckle and locking wing nut assemblies used in securing the front top and bottom cross tie chain portions, the bottom one being shown with a removable hook and the top one may be non removably hooked;

FIG. 5 is an enlarged partial side view of part of the removable throw-through smaller chain portion, showing its attachment to the chain;

FIG. 6 is a perspective view of the back of a tire and wheel assembly, also indicating a portion of the axle of a vehicle, and showing the overall tire chain, after it has been draped and after the removable throw-through smaller chain has been thrown below the axle to be easily reachable;

FIG. 7 is a perspective view of the back of a tire and wheel assembly, also indicating a portion of the axle of a vehicle, and showing the overall tire chain, after it has been draped and secured at the back, as the removable throw-through smaller chain has been utilized and then removed; and FIG. 8 is a perspective view of the front of a tire and wheel assembly, indicating the hook up of the turnbuckle assemblies after they have been tightened.

Although tire chains are illustrated and described using chain links, cable-roller tire chains are also adaptable to having the two principal counterbalanced portions securable with turnbuckles.

DESCRIPTION OF THE PREFERRED EMBODIMENT

Overall Tire Chain — Two Principal Counter-Balanced Portions

The overall tire chain 10 which is quickly drapable and securable to effectively obtain traction during snow and ice hazardous roadway travel has, in effect, two principal counter-balanced tire chain portions 12, 14. Using these two portions 12, 14 with paired turnbuckle connecting and take up assemblies 16, 18, an overall tire chain 10 is provided for immediate installation on a mounted tire wheel assembly 20, wihtout moving and/or jacking up a vehicle 22, as illustrated and indicated in FIGS. 1, 6, 7 and 8.

Cross Tie Chains Connecting Counter-Balanced Portions

As illustrated in FIG. 2, overall tire chain 10, when stretched out prior to installation, has the two principal counter-balanced tire chain portions 12, 14, preferably somewhat permanently connected together by a top and back cross tie chain 24, and also by a top and front cross tie chain 26, which includes the top turnbuckle connecting and take up assembly 16. At the bottom and back of the overall tire chain 10, the two principal counter-balanced tire chain portions 12, 14 are connected together by a bottom and back cross tie chain 28 which includes hook 30, as illustrated in FIG. 3 in the secured position.

Turnbuckle Connecting and Take up Assemblies with Wing Lock Nuts

The top and front cross tie chain 26 includes the top turnbuckle connecting and take up assembly 16, having turnbuckle 40 and locking wing nut 42, arranged as indicated in FIG. 4. The turnbuckle utilizes the nearly closed end ring 44 and partially open hook end 46. At this top and front cross tie chain 26, both of the turnbuckle ends may be nearly closed end rings 44. However, at the bottom front cross tie chain 48, one end must remain a partially open hook end 46, so the overall installation of the tire chain 10 may be made very conveniently, as indicated by the successive steps illustrated in FIGS. 6, 7 and 8. After each turnbuckle 40 is turned up tightly, the respective wing lock nuts 42 are tightened to keep turnbuckle connecting and take up assemblies 16, 18 well secured, so they will remain tight until intentionally loosened.

Road Contacting and Tire Contacting Transverse Tire Chains or Cable Rollers Fit Snugly Against the Tire The several road contacting and tire contacting transverse road active tire chains 50, illustrated in the drawings, or the cable rollers illustrated in U.S. Pat. No. 2,714,914, if either types are used, then upon tightening of the turnbuckles 40, they are moved into a snug fit against the tire 52 mounted on the wheel 54, immediately upon the first installation of the overall tire chain 10. Once the initial evenly balanced draping and preliminary hookups are done, then the convenient turnbuckle tightening results in this snug fit of these transverse road active tire chains 50. They so remain snugly fitted, as long as the paired turnbuckle take up assemblies 16, 18 remain locked with the locking wing nuts 42.

No Other Stops are Necessary For Chain Adjustment

There is now no need for a motorist using these overall chains 10, to stop a vehicle to adjust his or her recently mounted chains 10, as previously was often necessary with other types of chains, to keep them from beating against the pavement and/or portions of the vehicle 22, even when bad weather slower driving speeds were the only speeds attained.

One Overall Tire Chain Size Fits Many More Tires of Many Sizes

Moreover, because, upon the full tightening of the paired turnbuckle connecting and take up assemblies 16, 18, these overall tire chains 10 fit readily, as their two principal counter balanced portions 12, 14, conform to a tire 52, the utilization of the adjustable overall length threaded turnbuckles 40, makes it possible to use a given size overall tire chain 10 on several different tires of several different sizes. As a consequence, fewer sizes of these overall tire chains 10, need to be produced, distributed and stocked to meet the demands of motorists when the cold, ice, and snow weather comes.

Convenient, Quick Securement and Removal of these Overall Tire Chains

In summary, the overall tire chains 10 equipped with regular transverse road active contacting tire chains 50, or with special cleated transverse road active tire chains, or with cable-roller transverse road active contacting chain like functioning portions, are conveniently carried in a vehicle to be immediately available when a storm hits. The vehicle 22 is stopped in a safe place off the principal roadway hard surface portions, and the overall tire chains 10 are removed from their box and draped over the tire 52 of the mounted tire and wheel assembly 20. The two principal counter balanced portions 12 and 14 are arranged opposite one another to the front and rear portions of the tire 52 in their stopped position, as illustrated in FIG. 1.

The throw-through chain 32 is quickly attached and used as a convenient way to position the bottom and back cross tie chain 28. It is then removed and used on the other side of the vehicle 22. The hook 30 is then readily utilized and the top and bottom back cross tie chains 24, 28 are secured. Turnbuckle connecting and take up assembly 16 is generally preassembled and is then in its resulting place awaiting the final tightening. Turnbuckle connecting and take up assembly 18 is quickly finally assembled and hooked. Thereafter, both turnbuckles 40 are tightened and then locked by using the locking wing nuts 42. The vehicle 22 is then ready to drive with the confidence to be gained by having these overall tire chains 10 mounted on the tires 52 of two driving wheels 54.

When the road conditions improve and these overall tire chains 10 are no longer needed on the tires 52 of the driving wheels 54, and must be taken off as soon as possible to reduce their wear and keep them in readiness for the next storm, they are removed very quickly. The locking wing nuts 42 are loosened, the turnbuckles 40 are loosened, hooks 46 and 30 are unhooked, and thereafter, the overall tire chain 10 is lifted up and pulled clear of the mounted tire and wheel assembly 20 and carried to its storage place in the vehicle 22.

I claim:

1. A quickly installed traction tire chain of essentially two principal counter balanced tire chain portions, made of standard components, and installed by using draping, throw through and dual tightening procedures, all performed from a position alongside the outside of the mounted tire and wheel on a vehicle, comprising:

a. two principal alike counter balanced standard tire chain portions having standard cross tire chain portions and therefore being entirely composed of all standard traction tire chain components;

b. interconnector receiving means on both said counter balanced chain portions located at their respective top inside chain end and top outside chain end, and bottom inside chain end and bottom outside chain end;

c. various interconnectors for joining the said two principal alike counter balanced standard tire chain portions at their said respective interconnector receiving means, these said various interconnectors comprising, in turn;

1. a short continuous length of standard tire chain serving to connect the said two principal alike counter balanced standard tire chain portions, using the said interconnector receiving means at the then arranged opposite spaced top inside chain ends, such connection occurring during the manufacture of the said quickly installed traction tire chain;
2. a hook and standard short continuous length of standard tire chain, having at the outset a removable throw through lightweight standard chain portion, all arranged as a sub assembly, serving, after draping of the said quickly installed traction tire chain, to connect the said two principal alike counter balanced standard tire chain portions, using the said interconnector receiving means at the then arranged opposite spaced bottom inside chain ends;
3. a top outside turnbuckle, turnbuckle locking means, and a standard very short continuous length of standard tire chain, all arranged as an interconnector sub assembly, serving, before the draping of the said quickly installed traction tire chain to preliminarily connect the said two principal alike counter balanced standard tire chain portions, using the said interconnector receiving means at the then arranged opposite spaced top outside chain ends; and
4. a bottom outside turnbuckle, turnbuckle locking means, and a standard very short continuous length of standard tire chain, all arranged as in interconnector subassembly, serving, after both the draping of the said quickly installed traction tire chain and the throwing through of the light weight standard chain portion, to preliminarily connect the said two principal alike counter balanced standard tire chain portions, using the said interconnector receiving means at the then arranged opposite spaced bottom outside chain ends; and thereafter, equally spacing the standard cross tire chain portions of each principal alike counter balanced standard tire chain portion while at the same time acquiring and maintaining the opposite balancing positions of these said counterbalanced standard tire chains portions, and then equally tightening the said top outside and bottom outside turnbuckles of each interconnector sub assembly of a turnbuckle, turnbuckle locking means, and a standard very short continuous length of standard tire chain, to complete the very tight engagement of the said quickly installed traction tire chain to the mounted tire without jacking up the vehicle, without moving the vehicle, and without leaving an installing position alongside the outside of the mounted tire and wheel.

* * * * *